(12) United States Patent
Kitamura et al.

(10) Patent No.: US 8,476,840 B2
(45) Date of Patent: Jul. 2, 2013

(54) LED LIGHTING DEVICE AND LIGHTING EQUIPMENT

(75) Inventors: Noriyuki Kitamura, Hadano (JP); Keiichi Shimizu, Yokohama (JP); Hiroshi Terasaka, Yokohama (JP); Tomokazu Usami, Yokohama (JP)

(73) Assignee: Toshiba Lighting & Technology Corporation

( * ) Notice: Subject to any disclaimer, the term of this patent is extended or adjusted under 35 U.S.C. 154(b) by 420 days.

(21) Appl. No.: 12/547,969

(22) Filed: Aug. 26, 2009

(65) Prior Publication Data

US 2010/0052565 A1    Mar. 4, 2010

(30) Foreign Application Priority Data

Aug. 29, 2008  (JP) ................................. 2008-221692
Jul. 16, 2009  (JP) ................................. 2009-168174

(51) Int. Cl.
*H05B 37/02*    (2006.01)
(52) U.S. Cl.
USPC ............................ 315/291; 315/247; 315/128
(58) Field of Classification Search
USPC .................................. 315/291, 247, 122, 128
See application file for complete search history.

(56) References Cited

U.S. PATENT DOCUMENTS

| 5,345,376 | A |   | 9/1994 | Nourbakhsh et al. |
| 5,846,845 | A | * | 12/1998 | Ikeda et al. ................... 438/238 |
| 6,429,632 | B1 |   | 8/2002 | Forbes et al. |
| 7,239,087 | B2 | * | 7/2007 | Ball ............................... 315/128 |
| 7,329,998 | B2 | * | 2/2008 | Jungwirth ...................... 315/291 |
| 2006/0279565 | A1 |   | 12/2006 | Wei et al. |
| 2007/0018614 | A1 | * | 1/2007 | Effing ............................ 320/140 |
| 2007/0223219 | A1 | * | 9/2007 | Medendorp et al. ........... 362/231 |
| 2009/0026499 | A1 | * | 1/2009 | Kikawa et al. ................ 257/194 |
| 2010/0109537 | A1 |   | 5/2010 | Nishino et al. |

FOREIGN PATENT DOCUMENTS

| FR |  | 2642915 | A1 | 8/1990 |
| JP |  | 2008-130295 | A | 6/2008 |
| WO |  | 2005/036723 | A1 | 4/2005 |
| WO |  | 2006051479 | A2 | 5/2006 |
| WO | WO-2008/050679 | A1 | 5/2008 |

OTHER PUBLICATIONS

Office Action with English translation dated Jun. 6, 2012 issued in corresponding CN Patent Application No. 200910167590.6.

* cited by examiner

*Primary Examiner* — James H Cho
(74) *Attorney, Agent, or Firm* — McDermott Will & Emery LLP

(57) ABSTRACT

An LED lighting device includes light emitting diode, a current control circuit having a first series circuit of first and second switching elements, a second series circuit of third and fourth switching elements, and a condenser, which is configured so that the first and second series circuits are parallel connected and the condenser is connected between a connection point of the first and second switching elements and a connection point of the third and fourth switching elements, and a control circuit for alternatively on-off controlling a pair of the first and fourth switching elements and a pair of the second and third switching elements.

12 Claims, 6 Drawing Sheets

LED LIGHTING DEVICE AND LIGHTING EQUIPMENT

INCORPORATION BY REFERENCE

The present invention claims priority under 35 U.S.C. §119 to Japanese Patent Application Nos. 2008-221692 and 2009-168174 filed on Aug. 29, 2008 and Jul. 16, 2009, respectively. The contents of these applications are incorporated herein by reference in their entirety.

TECHNICAL FIELD

The present invention relates to an LED lighting device and a lighting equipment mounting this LED lighting device.

BACKGROUND OF THE INVENTION

In an LED lighting device used for a lighting equipment, a plurality of light emitting diodes (LEDs) are used to obtain a required amount of light output. Here, if the light emitting diodes are series-connected, direct voltage supplied to the LEDs becomes high. If the LEDs are connected in parallel, current supplied to the diodes becomes large. Therefore, a plurality of light emitting diodes are connected in an appropriate series-parallel circuit in an LED lighting device.

If the light emitting diodes are connected in series-parallel, current flown to each of the LED load circuits connected in series-parallel must be balanced to uniformize light output from the plurality of light emitting diodes. For example, as shown in Japanese Laid-Open Patent Publication No. 2008-130295, an LED lighting circuit for collectively constant current controlling the current flowing in each of LED modulized the LED load circuits has been proposed. In the LED lighting circuit of this conventional art, control elements (transistors) configuring a current mirror circuit are provided in series to each of the LED load circuits, a control micro computer judges a circuit with the highest sum of on-voltage of the light emitting diodes, and on the basis thereof interlocks the energization current value of remaining circuits to balance between each of the LED load circuits.

In the LED lighting circuit described in the above-mentioned Japanese Laid-Open Patent Publication No. 2008-130295, control elements of a current mirror circuit are connected in series to an LED load circuit and therefore when current flows through the LED load circuit, power consumption is generated by multiplication of voltage between both edges of the control element and the current which flows through the LED load circuit. As a result thereof, there is a disadvantage that the power consumption becomes a loss and power efficiency of the LED lighting device is decreased.

The present invention aims to provide an LED lighting device by which power loss in a current control circuit for limiting current which flows into light emitting diodes is not easily generated and current flowing to the light emitting diodes can be controlled and a lighting equipment including the LED lighting device.

SUMMARY OF THE INVENTION

The present invention includes a light emitting diode; a current limit circuit, which has switching element and either a capacitive component or an inductive component connected to the switching element and is connected between the light emitting diode and a power source; and a control circuit for on-off controlling the switching element so that a predetermined amount of current flows to the light emitting diode.

The present invention and each of following inventions are configured as follows unless otherwise mentioned.

The current limit circuit is a high-frequency switching circuit such as an inverter circuit.

According to the present invention, if the switching element of the current limit circuit is on-off controlled by the control of the control circuit, the capacitive component discharges and charges between both ends of the capacitive component by the current from the power source and current from the power source which flows to both ends of the inductive component is limited by the inductive component. The discharged current discharged from the capacitive component or the current limited by the inductive component flows into the light emitting diode. Thus, the light emitting diode is lit.

Then, the discharge current of the capacitive component is limited by the capacity of the capacitive component, on-off frequency by the control circuit, and duty ratio of the switching element and the current limited by the inductive component is limited by the on-off frequency by the control circuit and dead time width during which the switching element is turned off. That is, the current which flows to the light emitting diode is the discharge current of the capacitive component of the current limit circuit or the current limited by the inductive component and because the current is generated by on-off operation of the switching element and power loss by resistance of the switching element or the inductive component is very small, power loss in the current limit circuit is not easily generated. Therefore, power consumption by the LED lighting device can be reduced and power efficiency can be improved.

Moreover, the present invention includes a light emitting diode; a current limit circuit having a switching element and a resonant circuit of a capacitive component and an inductive component connected to the switching element, which is connected between the light emitting diode and the power source; and a control circuit for on-off controlling the switching element so that a predetermined amount of current flows to the light emitting diode.

According to the present invention, current which flows to the light emitting diode is controlled by the on-off frequency by the control circuit. Therefore, if the switching element which is turned on when, for example, current flowing into the resonant circuit of the capacitive component and the inductive component become zero is off-controlled, generation of noise due to the on-off operation of the switching element is suppressed and current which flows into the light emitting diode can be maximized. Moreover, changing frequency so that the switching element can be turned off before the current flowing in the resonant circuit becomes zero enables limitation of current which flows in the light emitting diode. Because the current flowing in the resonant circuit of the capacitive component and inductive component of the current limit circuit is thus controlled by the on-off frequency of the switching element, light output control of the light emitting diode can be easily carried out by a simple configuration and at the same time the LED lighting device can be made smaller inexpensively.

Further, the present invention includes a DC power source circuit for converting AC voltage from an alternating current power source into DC voltage and outputting the DC voltage; an active filter circuit as a power source for supplying current to the light emitting diode to allow the light emitting diode to emit light which can vary and output the DC voltage output from the DC power source circuit; a current detection circuit for detecting current which flows to the light emitting diode; and an active filter control circuit for controlling an output voltage of the active filter circuit so that the current detection circuit can detect a predetermined amount of current.

The current detection circuit may directly detect current flowing in the light emitting diode or may detect correlated current, voltage, or power. That is, because current and voltage characteristics of the light emitting diode are approximately in proportional relation, detection of voltage also means detection of current. Moreover, the same is applied to a case where power, which is a product of current and voltage, is detected.

Then, adjustment of light output (power) from the light emitting diode may be carried out by control of the output voltage of the active filter circuit by the active filter control circuit.

Further, in the present invention, the current limit circuit includes the switching element and either the capacitive component and the inductive component, which are formed of a semi-conductor, and is configured by integration of the light emitting diode, the switching element, and either of the capacitive component or the inductive component.

The semi-conductor and the light emitting diode are formed of the same material. For example, the light emitting diode may be formed of gallium nitride (GaN) appropriate for high-frequency (high-speed).

According to the present invention, the light emitting diode, the switching element, and the capacitive component or the inductive component can be formed through the same process and at the same time can be formed on one same chip or modulized. Therefore, the LED lighting device can be made smaller. In addition, two wires can be led out so that the light emitting diode, the switching element, and the capacitive component or the inductive component can be series-connected to the circuit.

Further, the present invention includes the LED lighting device and an equipment main body on which the LED lighting device is mounted.

According to the present invention, it becomes possible to provide a lighting equipment which suppresses power loss because the LED lighting device is mounted.

DETAILED DESCRIPTION OF THE INVENTION

Hereinafter, embodiments of the present invention will be described with reference to the drawings. An embodiment of the present invention will be described.

Figure 1:
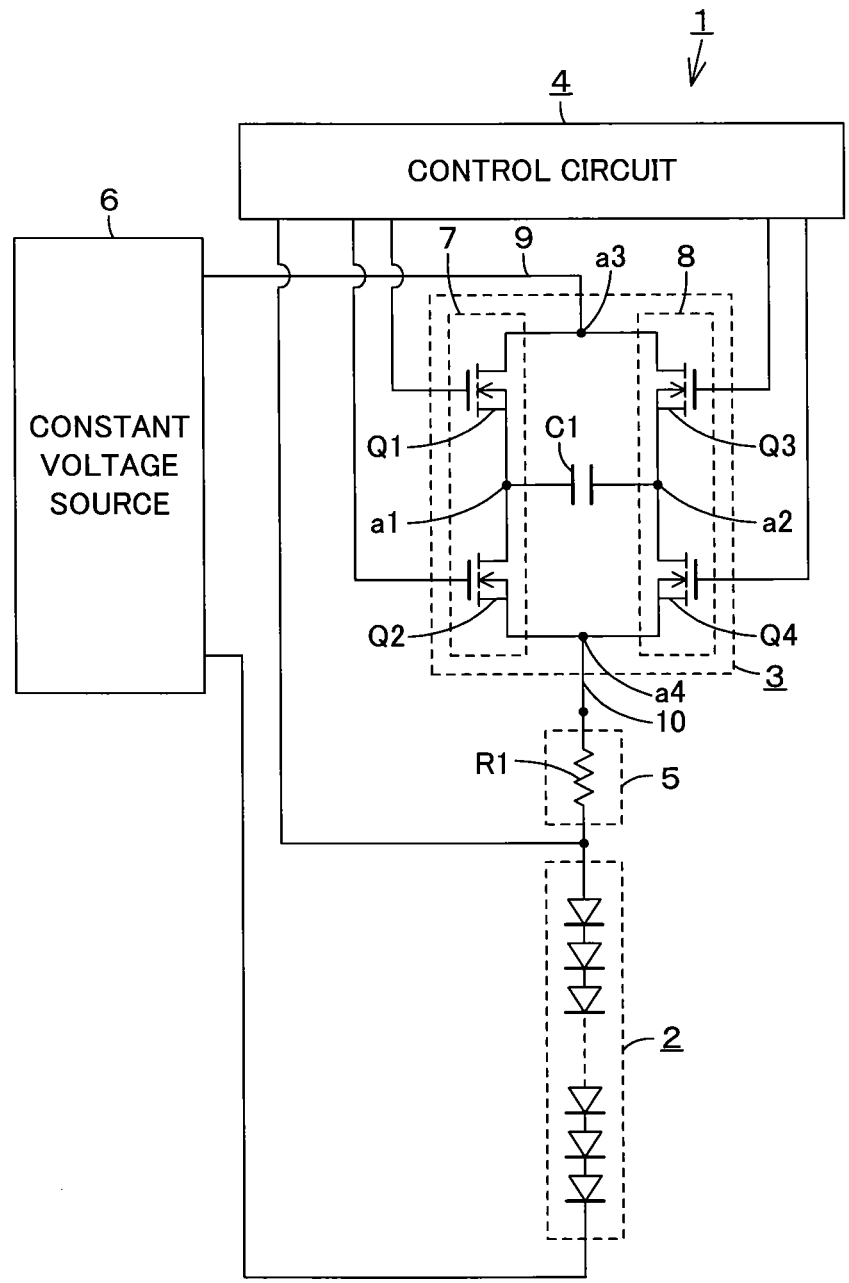
FIG. 1 is a schematic circuit diagram of an LED lighting device showing a first embodiment of the present invention.
Figure 2:
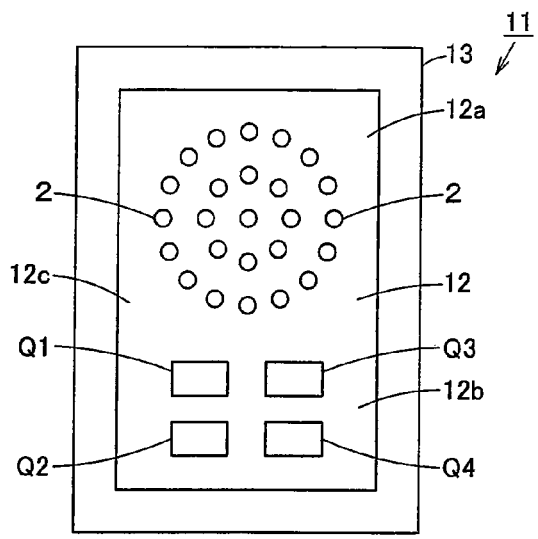
FIGS. 2(a) and 2(b) are schematic top views of an LED module.
Figure 2:
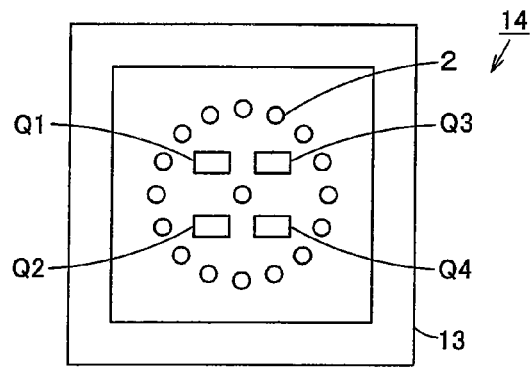
Figure 3:
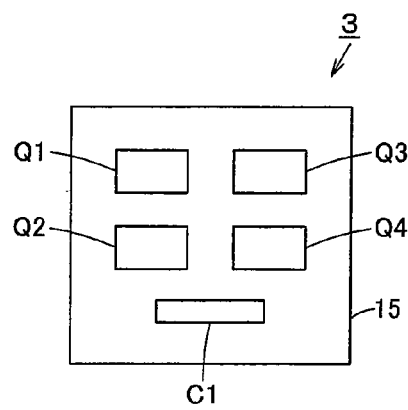
FIG. 3 is a schematic top view of a modulized current control circuit.

FIGS. 1 to 3 show an embodiment of the present invention. FIG. 1 is a schematic circuit diagram of an LED lighting device, FIGS. 2(a) and 2(b) are schematic top views of an LED module, and FIG. 3 is a schematic top view of a modulized current control circuit.

In FIG. 1, an LED lighting device 1 includes light emitting diode 2, a current control circuit 3 and a control circuit 4 as a high-frequency switching circuit.

The light emitting diode 2 is configured to emit, for example, white color light which is used as an illumination light. A plurality of light emitting diodes 2 are connected in series. The series-connected light emitting diodes 2 are connected to a constant voltage source 6 as a power source via the current control circuit 3 and a current detection circuit 5. Here, the light emitting diodes 2 may be connected to a front stage side of the current control circuit 3.

The current detection circuit 5 includes, for example, a resistance R1, and converts current which flows to the light emitting diodes 2 into voltage and detects it. The detected current is input into the control circuit 4. The constant voltage source 6 converts AC voltage from an AC power source (not shown) into DC voltage and outputs a constant current which is direct current.

Then, the current control circuit 3 is a so-called full-bridge type inverter circuit including a first series circuit 7 which is a series circuit of a first switching element Q1 being a switching element and a second switching element Q2 being a switching element, a second series circuit 8 which is a series circuit of a third switching element Q3 being a switching element and a fourth switching element Q4 being a switching element, and a condenser C1 as a capacitive component. The first to fourth switching elements Q1 to Q4 are composed of a field-effect transistor.

The condenser C1 is connected between a connection point a1 of the first switching element Q1 and the second switching element Q2 and a connection point a2 of the third switching element Q3 and the fourth switching element Q4. Hereinafter, the "connection point" includes a current carrying section where the switching elements are connected in addition to a portion where the switching elements are connected. Then, the first series circuit 7 and the second series circuit 8 are connected in parallel as drains of the first and third switching elements Q1 and Q3 and sources of the second and fourth switching elements Q2 and Q4 are respectively connected. Lead wires 9 and 10 are led out from the connection points a3 and a4. The lead wire 9 is connected to one output terminal of the constant voltage source 6 and the lead wire 10 is connected to the current detection circuit 5.

The control circuit 4 is configured so as to alternately on-off control the first switching element Q1 and the fourth switching element Q4 of the current control circuit 3 as a unit and the second switching element Q2 and the third switching element Q3 of the current control circuit 3 as a unit. Then, the control circuit 4 carries out the on-off control so that the current detection circuit 5 detects a predetermined amount of current (desired current), that is, the predetermined amount of current flows to the light emitting diodes 2.

Next, operation of the embodiment of the present invention will be described.

If the first and fourth switching elements Q1 and Q4 of the current control circuit 3 are on-controlled and the second and third switching elements Q2 and Q3 are off-controlled by the control circuit 4, the condenser C1 is charged from the connection point a1 side (one edge side) by the current from the constant voltage source 6. Then, if the first and fourth switching elements Q1 and Q4 are off-controlled and subsequently the second and third switching elements Q2 and Q3 are on-controlled by the control circuit 4, the condenser C1 is charged from the connection point a2 side (the other edge side) by the current from the constant voltage source 6 while discharging from the connection point a1 side (the one edge side). Then, if the second and third switching elements Q2 and Q3 are off-controlled and subsequently the first and fourth switching elements Q1 and Q4 are on-controlled by the control circuit 4, the condenser C1 is charged from the connection point a1 side (the one edge side) by the current from the constant voltage source 6 while discharging from the connection point a2 side (the other edge side). Then, after the first and fourth switching elements Q1 and Q4 are off-controlled, the second and third switching elements Q2 and Q3 are on-controlled by the control circuit 4. The above-mentioned operations are repeated afterward.

The current discharged from the condenser C1 flows into the light emitting diode 2 through the current detection circuit 5. Thus, the light emitting diode 2 is lit. Then, the discharge current from the condenser C1 is set by the capacity of the condenser C1, on-off frequency by the control circuit 4, and duty ratio of the first and fourth switching elements Q1 and Q4 and the second and third switching elements Q2 and Q3. The condenser capacity is determined by the condenser C1 which is selected and provided. The control circuit 4 controls the on-off frequency and the duty ratio of the first and fourth switching elements Q1 and Q4 and the second and third switching elements Q2 and Q3 so that a predetermined amount of current (desired current) flows into the light emitting diode 2.

As mentioned above, the current which flows into the light emitting diode 2 is a discharge current from the condenser C1 of the current control circuit 3 and the discharge current is generated by on-off operation of the first to fourth switching elements Q1 to Q4. Moreover, power loss caused by the on-off operation of the first to fourth switching elements Q1 to Q4 is very small. Therefore, power loss is not easily caused by the current control circuit 3 and thus it becomes possible to reduce power consumption by the LED lighting device 1 and to improve power efficiency.

Moreover, since the current control circuit 3 is a full-bridge type circuit, it becomes possible to suppress the number of passive components and to realize a smaller device with lower cost.

Further, as shown in FIG. 2(a), the first to fourth switching elements Q1 to Q4 of the current control circuit 3 and the light emitting diodes 2 may be integrated to configure an LED module 11. The first to fourth switching elements Q1 to Q4 and the light emitting diodes 2 are formed on an upper surface 12c of a silicon (Si) plate 12. That is, the light emitting diodes 2 are formed on one edge side 12a of the silicon plate 12 and the first to fourth switching elements Q1 to Q4 are formed on an other edge side 12b of the silicon plate 12. The silicon plate 12 is attached to a radiator plate 13 of, for example, aluminum (Al).

Moreover, the first to fourth switching elements Q1 to Q4 and the light emitting diodes 2 of the current control circuit 3 may be integrated to configure an LED module 14, as shown in FIG. 2(b). The first to fourth switching elements Q1 to Q4 are formed inside the light emitting diodes 2 provided in a circular pattern.

Further, the LED modules 11 and 14 may further form the condenser C1 of the current control circuit 3. The first to fourth switching elements Q1 to Q4 and the condenser C1 may be formed into a semi-conductor with the same material that is used for the light emitting diodes 2 such as silicon (Si).

Further, the first to fourth switching elements Q1 to Q4 of the current control circuit 3 and the condenser C1 may be configured on the same chip 15 as shown in FIG. 3. The chip 15 is made of, for example, a silicon (Si) plate.

The LED lighting device 1 can be formed smaller if the LED module 11 or the LED module 14 is configured. Moreover, if the current control circuit 3 is configured on the same chip 15, the device can be formed smaller. Then, configuration of the LED module 11 or the LED module 14 enables to lead out two wires from the LED modules 11 and 14 and therefore the LED modules 11 and 14 can be series-connected to the circuit.

Next, another embodiment of the present invention will be described.

Figure 4:
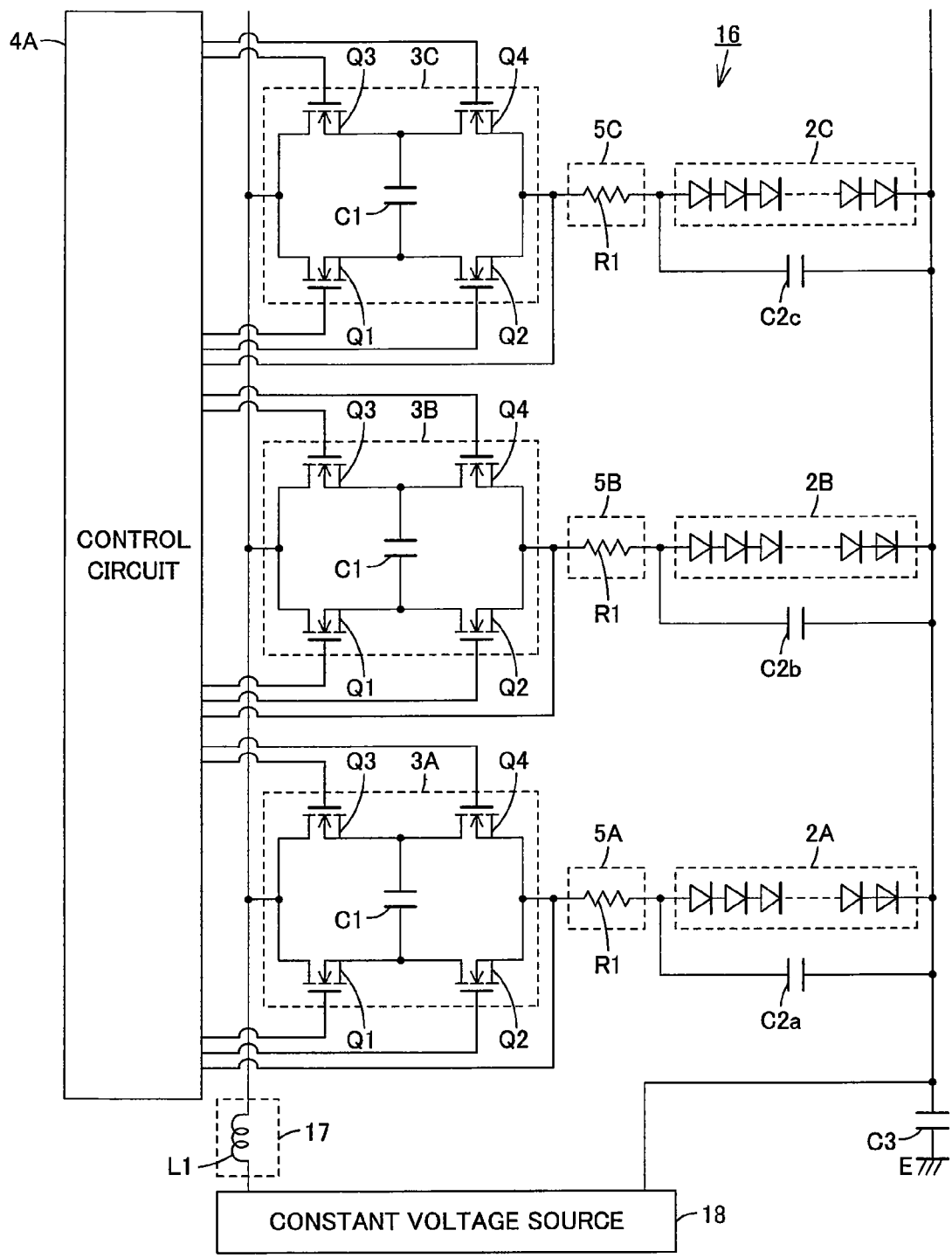
FIG. 4 is a schematic circuit diagram of an LED lighting device showing another embodiment of the present invention.

FIG. 4 is a schematic circuit diagram of an LED lighting device showing the other embodiment of the present invention. Here, the same reference numerals are given to parts the same as in FIG. 1 and explanation thereof is omitted.

In an LED lighting device 16 shown in FIG. 4, the current control circuit 3, the current detection circuit 5, and a plurality of series circuits of the light emitting diodes 2 shown in FIG. 1 are parallel-connected and are connected to a constant voltage source 18 via an impedance element 17. Then, smoothing condensers C2a to C2c are respectively connected to series-connected light emitting diodes 2A to 2C. Moreover, the cathode side of the light emitting diodes 2A to 2C is connected to an earth E via a condenser C3.

The constant voltage source 18 converts AC voltage from an AC power source (not shown) into DC voltage and outputs DC constant voltage. The impedance 17 includes an inductor L1 and limits current from the constant voltage source 18. Here, the impedance element 17 may be a resistance.

A control circuit 4A controls on-off frequency and duty ratio of the first switching element Q1 and the fourth switching element Q4 and the second switching element Q2 and the third switching element Q3 so that each of the current detection circuits 5A to 5C detects a predetermined amount of current (desired current). Thus, the predetermined amount of current (desired current) flows to the light emitting diodes 2A to 2C and the light emitting diodes 2A to 2C are lit. The light emitting diodes 2A to 2C are lit with a certain amount of light output irrespective of variation in a forward voltage ($V_f$) of each of the diodes. Thus, it becomes possible to approximately uniformize light output of the light emitting diodes 2A to 2C.

Then in the LED lighting device 16, power loss does not easily occur in the current control circuits 3A to 3C, thereby power efficiency can be improved.

Next, a further embodiment of the present invention will be described.

Figure 5:
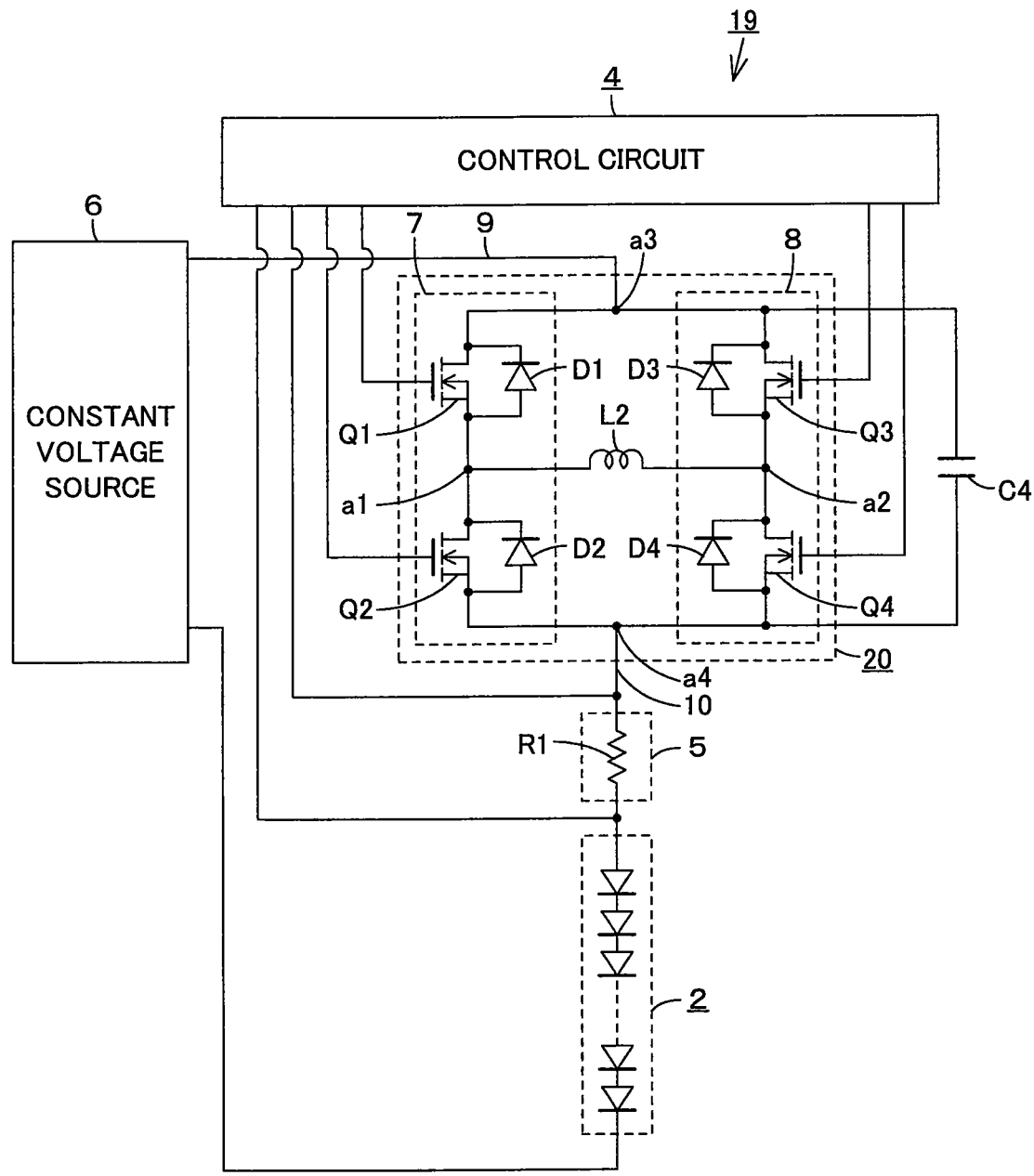
FIG. 5 is a schematic circuit diagram of an LED lighting device showing a further embodiment of the present invention.

FIG. 5 is a schematic circuit diagram of an LED lighting device showing a further embodiment of the present invention. Here, the same reference numerals are given to parts the same as in FIG. 1 and explanation thereof is omitted.

In an LED lighting device 19 shown in FIG. 5, the condenser C1 of the current control circuit 3 of the LED lighting device 1 shown in FIG. 1 is replaced by an inductor L2 as an inductive component to configure a current control circuit 20 as a high frequency switching circuit. Moreover, between both edges of the first and the second series circuits 7 and 8, a condenser C4 as a capacitive component is connected. Here, diodes D1 to D4 for regeneration are connected between the drain and the source of the first to fourth switching elements Q1 to Q4.

The control circuit 4 alternately on-off controls the first and fourth switching elements Q1 and Q4 and the second and third switching elements Q2 and Q3 of the current control circuit 20. Then, if the first and fourth switching elements Q1 and Q4 are on-controlled and the second and third switching elements Q2 and Q3 are off-controlled by the control circuit 4, current from the constant voltage source 6 flows through a path that is from the first switching element Q1 to the inductor L2 and to the fourth switching element Q4. The current is limited by the inductor L2 and flows to the current detection circuit 5 side. Then, if the first and fourth switching elements Q1 and Q4 are off-controlled by the control circuit 4, regenerated current by electromagnetic energy accumulated in the inductor L2 flows through a path from the diode D1 to the condenser C4 and to the diode D4.

If the first and fourth switching elements Q1 and Q4 are off-controlled by the control circuit 4 and subsequently the second and third switching elements Q2 and Q3 are on-controlled by the control circuit 4, current from the constant voltage source 6 flows through a path that is from the third switching element Q3 to the inductor L2 and the second switching element Q2. The current is limited by the inductor L2 and flows to the current detection circuit 5 side. Then, if the second and third switching elements Q2 and Q3 are off-controlled by the control circuit 4, regenerated current by electromagnetic energy accumulated in the inductor L2 flows through a path that is from the diode D3 to the condenser C4 and to the diode D2. Then, after the second and third switching elements Q2 and Q3 are off-controlled, the first and fourth switching elements Q1 and Q4 are on-controlled by the control circuit 4. The above-mentioned operations are repeated afterward.

Then, the control circuit 4 controls on-off frequency of the first switching element Q1 and the fourth switching element Q4 and the second switching element Q2 and the third switching element Q3 and dead time width during which the first to fourth switching elements Q1 to Q4 are turned off so that the current detection circuit 5 detects a predetermined amount of current (desired current), that is, the predetermined amount of current flows to the light emitting diodes 2. Thus, the predetermined amount of current flows to the light emitting diodes 2 and the diodes are lit with a certain amount of light output.

As mentioned above, the current which flows to the light emitting diodes 2 flows through the inductor L2 of the current control circuit 20. Because resistance by the inductor L2 is very small, power loss at the inductor L2 is very small. Moreover, power loss at the first to fourth switching elements Q1 to Q4 is also very small. Therefore, power loss does not easily occur in the current control circuit 20 and because of this, it becomes possible to reduce power consumption by the LED lighting device 19 and to improve power efficiency.

Further, the inductor L2 may be formed into a semi-conductor with material the same as the one used for the switching elements Q1 to Q4 of the current control circuit 20 or for the light emitting diodes 2 such as gallium nitride or silicon to be integrated with the switching elements Q1 to Q4 and the light emitting diodes 2 to configure a module. If integrated in such a manner, it becomes possible to obtain similar effects as those in the above embodiment such as forming the LED lighting device 19 small.

Next, an embodiment of the present invention will be described.

Figure 6:
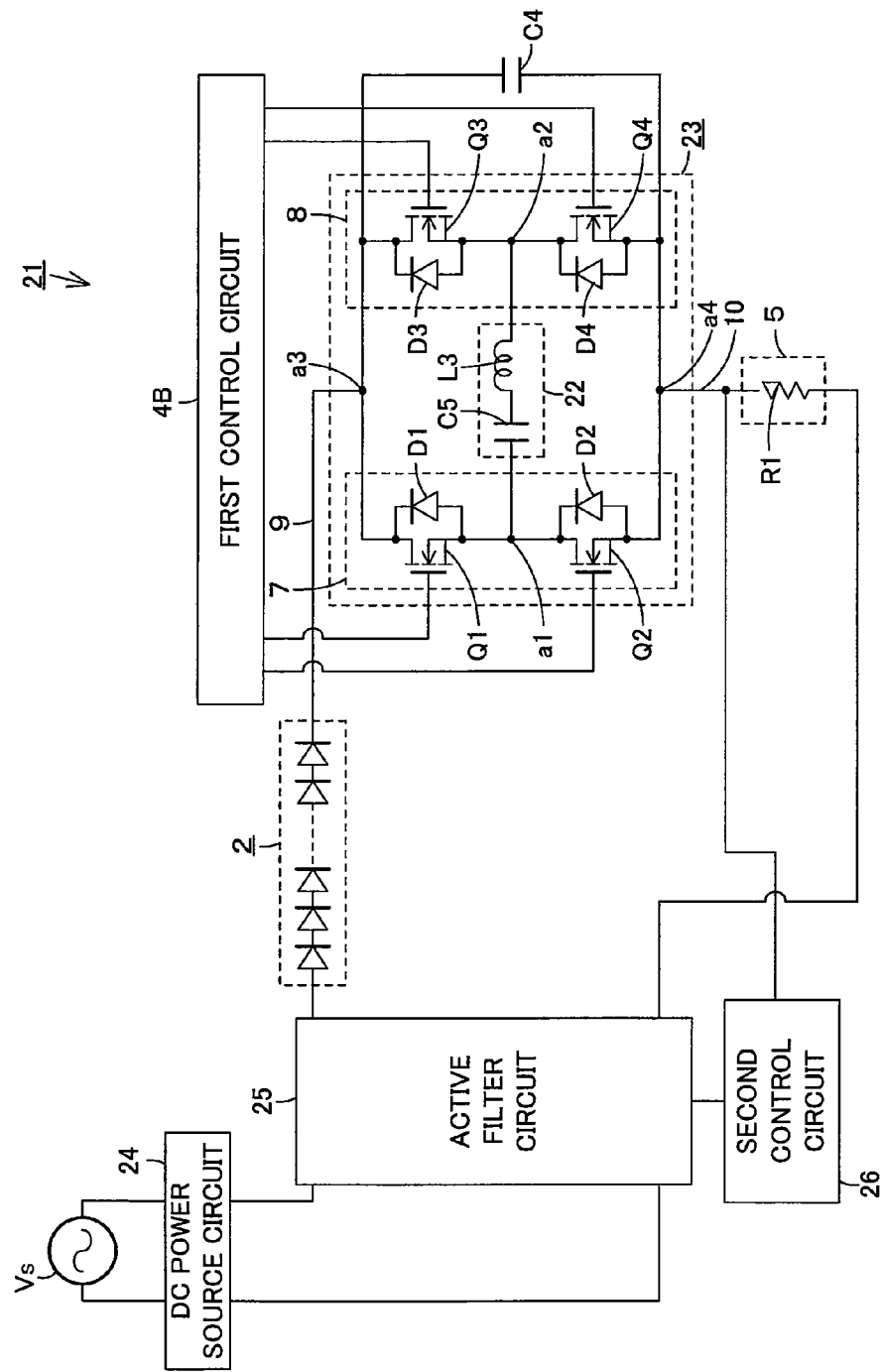
FIG. 6 is a schematic circuit diagram of an LED lighting device showing an embodiment of the present invention.

FIG. 6 is a schematic circuit diagram of an LED lighting device showing the embodiment of the present invention. Here, the same reference numerals are given to parts the same as in FIG. 5 and explanation thereof is omitted.

In an LED lighting device 21 shown in FIG. 6, the inductor L2 of the current control circuit 20 in the LED lighting device 19 shown in FIG. 5 is replaced by a current control circuit 23 as a high frequency switching circuit having a resonance circuit 22 of a condenser C5 as a capacitive component and an inductor L3 as an inductive component. The condenser C5 and the inductor L3 are series connected here. Moreover, instead of the constant voltage source 6, a DC power source circuit 24 and an active filter circuit 25 as a power source are configured. The light emitting diodes 2 are connected on a front stage of the current control circuit 23 and are lit by current supplied from the active filter circuit 25. Further, the LED lighting device 21 includes a first control circuit 4B as a control circuit and a second control circuit 26 as an active filter control circuit.

The condenser C5 and the inductor L3 of the resonance circuit 22 may be formed into a semi-conductor with silicon or the like and may be integrated to configure a module.

The DC power source circuit 24 is configured so as to convert AC voltage from a commercial AC power source $V_s$ into DC voltage and to output it. The DC power source circuit 24 maybe, for example, a rectifier. Moreover, the active filter circuit 25 can vary and output the DC voltage output from the DC power source circuit 24. For example, the active filter circuit 25 includes a chopper circuit and a power factor improvement circuit.

The second control circuit 26 is connected to the active filter circuit 25 and the current detection circuit 5. Then, the second control circuit 26 is configured to control the active filter circuit 25 so that the current detection circuit 5 detects a predetermined amount of current, that is, the predetermined amount of current flows to the light emitting diodes 2, and to control an output voltage of the active filter circuit 25.

The control circuit 4B alternately on-off controls the first and fourth switching elements Q1 and Q4 and the second and third switching elements Q2 and Q3 of the current control circuit 23. At this time, a resonant current flows to the resonance circuit 22 of the condenser C5 and the inductor L3. The control circuit 4B off-controls the switching elements Q1 to Q4, which are on-controlled, at the timing when the resonant current becomes zero. Thus, generation of noise in on-off control of the first and fourth switching elements Q1 and Q4 and the second and third switching elements Q2 and Q3 can be suppressed and at the same time current which flows into the light emitting diodes 2 can be maximized. Moreover, changing the frequency so that the switching elements Q1 to Q4 can be off-controlled before the current flowing in the resonance circuit 22 becomes zero enables control of the current which flows into the light emitting diodes 2.

As mentioned above, the current flowing in the resonance circuit 22 of the condenser C5 and inductor L3 of the current control circuit 23 is controlled by the on-off frequency of the switching elements Q1 to Q4. Therefore, light output from the light emitting diodes 2 can be easily controlled by a simple configuration and at the same time generation of noise can be suppressed. Therefore, it becomes unnecessary to provide a circuit for prevention of noise or a circuit for noise absorption. Thus, the LED lighting device 21 can be made small and at a low cost. Moreover, power loss is not easily generated in the current control circuit 23 similar to the current control circuit 20 shown in FIG. 5 and it becomes possible to ideally operate the lighting device without any loss especially by use of the resonance circuit 22 to increase impedance variation. Thus, it becomes possible to reduce power consumption of the LED lighting device 21 and to improve power efficiency.

Further, since the condenser C5 and the inductor L3 are integrated by a semi-conductor, the condenser C5 and the inductor L3 can be formed by the same process and at the same time can be formed on one same chip or modulized. Therefore, the LED lighting device 21 can be made small.

Next, another embodiment of the present invention will be described.

Figure 7:
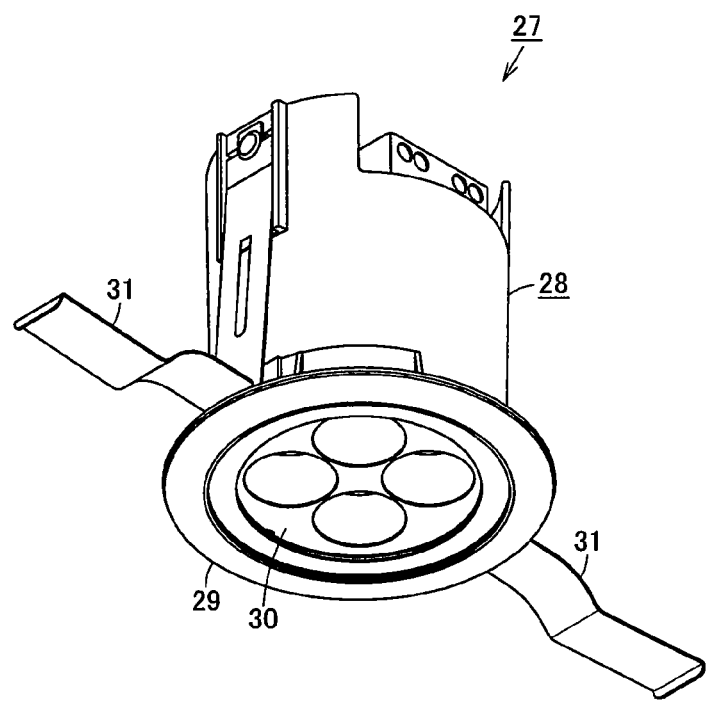
FIG. 7 is a schematic circuit diagram of lighting equipment showing another embodiment of the present invention.
Figure 8:
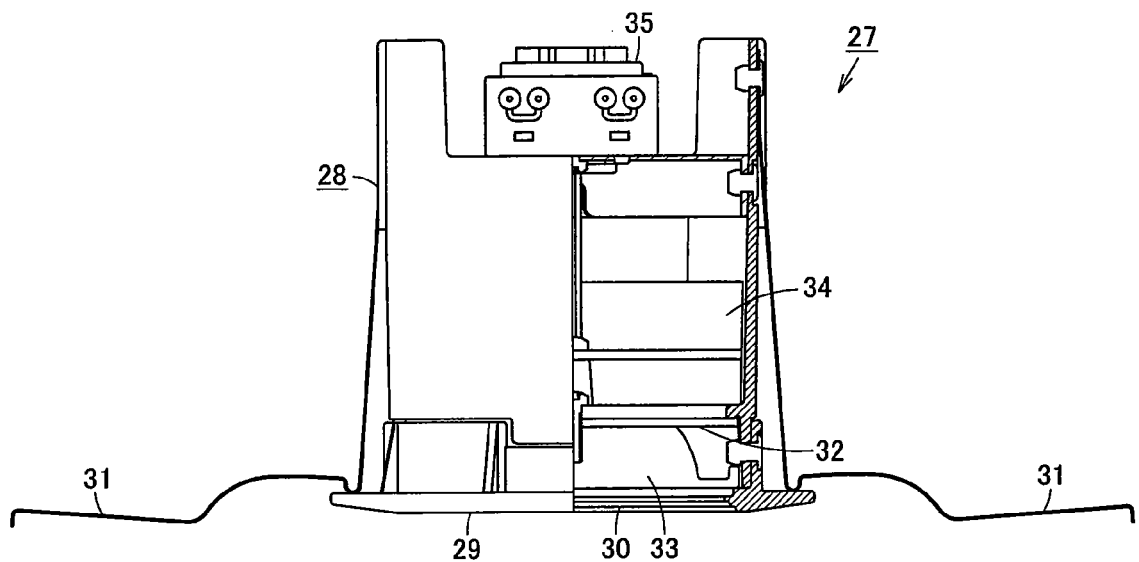
FIG. 8 is a side view of a lighting equipment with parts broken away for the sake of clarity.

FIG. 7 is a schematic perspective view of a lighting equipment showing the embodiment of the present invention and FIG. 8 is a side view of the lighting equipment with parts broken away for the sake of clarity. Here, the same reference numerals are given to parts the same as in FIG. 1 and explanation thereof is omitted.

The lighting equipment 27 shown in FIG. 7 is a down light embedded in a ceiling surface or the like. To the lower edge side of an approximately cylindrical main body 28, a round decoration frame 29 is provided and a translucent cover 30 is provided to the decoration frame 29. Moreover, a pair of attachment springs 31 and 31 for fixing the equipment main body 28 to the ceiling or the like a reattached to both left and rightsides of the equipment main body 28.

Further, the equipment main body 28 includes an LED module 32 and a reflection plate 33 with the light emitting diodes 2 provided at the inside of the lower edge side, as shown in FIG. 8. The light emitting diodes 2 are provided inside the LED module 32 on a lower edge side thereof. In addition, a power source unit 34 is provided inside the equipment main body 28. The current control circuit 3 and the like are provided to the power source unit 34. Then, on an upper surface side of the equipment main body 28, a terminal base 35 for connecting a power source wire from the power source (not shown) is provided.

Because the lighting equipment 27 includes an LED lighting device 1 having the current control circuit 3 which does not easily cause power loss, the lighting equipment 27 can suppress power loss.

Here, the capacitive component is not limited to each condenser and the inductive component is not limited to each inductor in each of the above-mentioned embodiments.

Moreover, the current limit circuit is not limited to the one having a full-bridge type inverter circuit and may include a half-bridge type inverter circuit or the like.

What is claimed is:

1. An LED lighting device comprising:
a light emitting diode;
a current limit circuit, which has a switching element and either a capacitive component or an inductive component connected to the switching element and is connected between the light emitting diode and a power source; and
a control circuit for on-off controlling the switching element so that a predetermined amount of current flows to the light emitting diode,
a DC power source circuit for converting AC voltage from an alternating current power source into DC voltage and outputting the DC voltage;
an active filter circuit as a power source for supplying current to the light emitting diode to allow the light emitting diode to emit light which can vary and output the DC voltage output from the DC power source circuit;
a current detection circuit for detecting current which flows to the light emitting diode; and
an active filter control circuit for controlling output voltage of the active filter circuit so that the current detection circuit can detect a predetermined amount of current.

2. An LED lighting device comprising:
a light emitting diode;
a current limit circuit which has a switching element and a resonant circuit of a capacitive component and an inductive component connected to the switching element; and
a control circuit for on-off controlling the switching element so that a predetermined amount of current flows to the light emitting diode,
a DC power source circuit for converting AC voltage from an alternating current power source into DC voltage and outputting the DC voltage;
an active filter circuit as a power source for supplying current to the light emitting diode to allow the light emitting diode to emit light which can vary and output the DC voltage output from the DC power source circuit;
a current detection circuit for detecting current which flows to the light emitting diode; and
an active filter control circuit for controlling output voltage of the active filter circuit so that the current detection circuit can detect a predetermined amount of current.

3. An LED lighting device comprising:
a light emitting diode;
a current limit circuit connected between the light emitting diode and a power source, the current limit circuit comprising:
a first series circuit and a second series circuit each of which comprises one switching element and the other switching element connected in series, the first and second series circuits being connected in parallel, and
at least one of a capacitive component or an inductive component that connects a connection point between the switching elements of the first series circuit and a connection point between the switching elements of the second series circuit; and
a control circuit for controlling the current limit circuit so that a predetermined amount of current flows to the light emitting diode by alternately repeating a control of turning the one switching element of the first series circuit and the other switching element of the second series circuit on and turning the other switching element of the first series circuit and the one switching element of the second series circuit off, and a control of turning the one switching element of the first series circuit and the other switching element of the second series circuit off and turning the other switching elements of the first series circuit and the one switching element of the second series circuit on.

4. The LED lighting device according to claim 3, wherein:
the light emitting diode and the switching elements are made of gallium nitride as a main material, and are mounted in a region different from each other in the same common plate so as to constitute an LED module, and
the LED lighting device includes a radiator plate to which is attached to the LED module.

5. The LED lighting device according to claim 4, wherein either the capacitive component or the inductive component is configured by integration in the LED module.

6. A lighting equipment including:
the LED lighting device according to claim 4; and
an equipment main body on which the LED lighting device is mounted.

7. The LED lighting device according to claim 4, wherein the LED module includes a silicon plate.

8. An LED lighting device comprising:
a light emitting diode;
a current limit circuit is connected between the light emitting diode and a power source, the current limit circuit comprising:
a first series circuit and a second series circuit each of which comprises one switching element and the other switching element connected in series, the first and second series circuits being connected in parallel, and
a resonant circuit of a capacitive component and an inductive component that connects a connection point between the switching elements of the first series circuit and a connection point between the switching elements of the second series circuit; and a control circuit for controlling the current limit circuit so that a predetermined amount of current flows to the light emitting diode by alternately repeating a control of turning the one switching element of the first series circuit and the other switching element of the second series circuit on and turning the other switching element of the first series circuit and the one switching element of the second series circuit off, and a control of turning the one switching element of the first series circuit and the other switching element of the second series circuit off and turning the other switching elements of the first series circuit and the one switching element of the second series circuit on.

9. The LED lighting device according to claim 8, wherein:
the light emitting diode and the switching elements are made of gallium nitride as a main material, and are mounted in a region different from each other in the same common plate so as to constitute an LED module, and
the LED lighting device includes a radiator plate which is attached to the LED module.

10. A lighting equipment including:
the LED lighting device according to claim 9; and
an equipment main body on which the LED lighting device is mounted.

11. The LED lighting device according to claim 9, wherein the resonant circuit of the capacitive component and the inductive component is configured by integration in the LED module.

12. The LED lighting device according to claim 9, wherein the LED module includes a silicone plate.

* * * * *